United States Patent
Anger et al.

[11] Patent Number: 5,957,245
[45] Date of Patent: Sep. 28, 1999

[54] DISC BRAKE, DISC BRAKE CALIPER AND DISC BRAKE SHOE

[75] Inventors: Stefan U. Anger, Oxford; Daniel D. Keck, Westland; Jeffrey R. Skvarce, Clarkston, all of Mich.

[73] Assignee: ITT Manufacturing Enterprises Inc., Wilmington, Del.

[21] Appl. No.: 08/905,984

[22] Filed: Aug. 5, 1997

[51] Int. Cl.⁶ .................................................. F16D 55/00
[52] U.S. Cl. ................. 188/71.1; 188/247; 188/250 B; 188/258
[58] Field of Search ............................. 188/71.1, 73.1, 188/73.45, 250 B, 258

[56] References Cited

U.S. PATENT DOCUMENTS

| | | | |
|---|---|---|---|
| 807,370 | 12/1905 | Gallagher | 188/258 |
| 1,907,635 | 5/1933 | Winters | 188/258 |
| 3,972,393 | 8/1976 | Courbet et al. | 188/73.1 X |
| 4,219,106 | 8/1980 | Lüpertz . | |
| 4,548,300 | 10/1985 | Sheill et al. | 188/73.1 |
| 4,566,564 | 1/1986 | Bolenbaugh et al. | 188/73.1 X |
| 4,823,920 | 4/1989 | Evans | 188/73.45 X |
| 5,111,914 | 5/1992 | Thiel et al. . | |
| 5,363,944 | 11/1994 | Thiel et al. | 188/73.1 X |
| 5,396,972 | 3/1995 | Grele | 188/250 G |
| 5,535,856 | 7/1996 | McCormick et al. | 188/73.36 |

FOREIGN PATENT DOCUMENTS 3903251  11/1989  Germany .

*Primary Examiner*—Robert J. Oberleitner
*Assistant Examiner*—Pamela J. Lipka
*Attorney, Agent, or Firm*—Rader, Fishman & Grauer PLLC

[57] ABSTRACT

In order to realize a two-piston floating caliper disc brake with a wide caliper, the axially outer side of the caliper is supported by radially extending protrusions shaped on the outer brake shoe. While the two protrusions have the same depth, they differ in their width. Corresponding circular grooves within the caliper around recess openings on the opposite side of the brake cylinders, however, are identical. Therefore, a radial support of the brake caliper can be carried out by both protrusions while a tangential positioning of the caliper is limited to the wider one of the two protrusions.

6 Claims, 3 Drawing Sheets

FIG 3
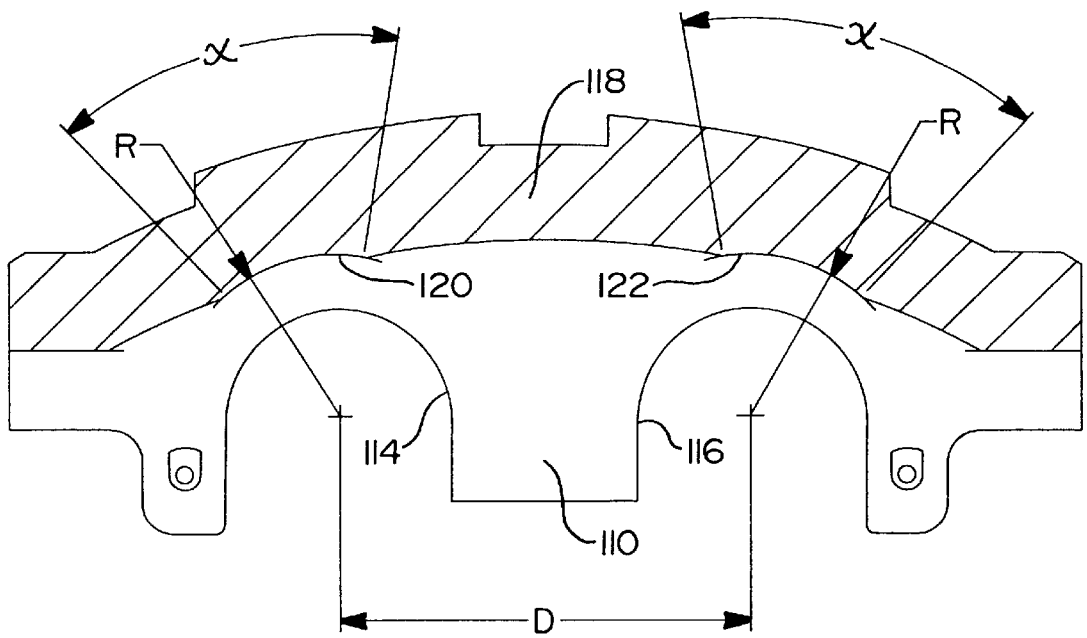
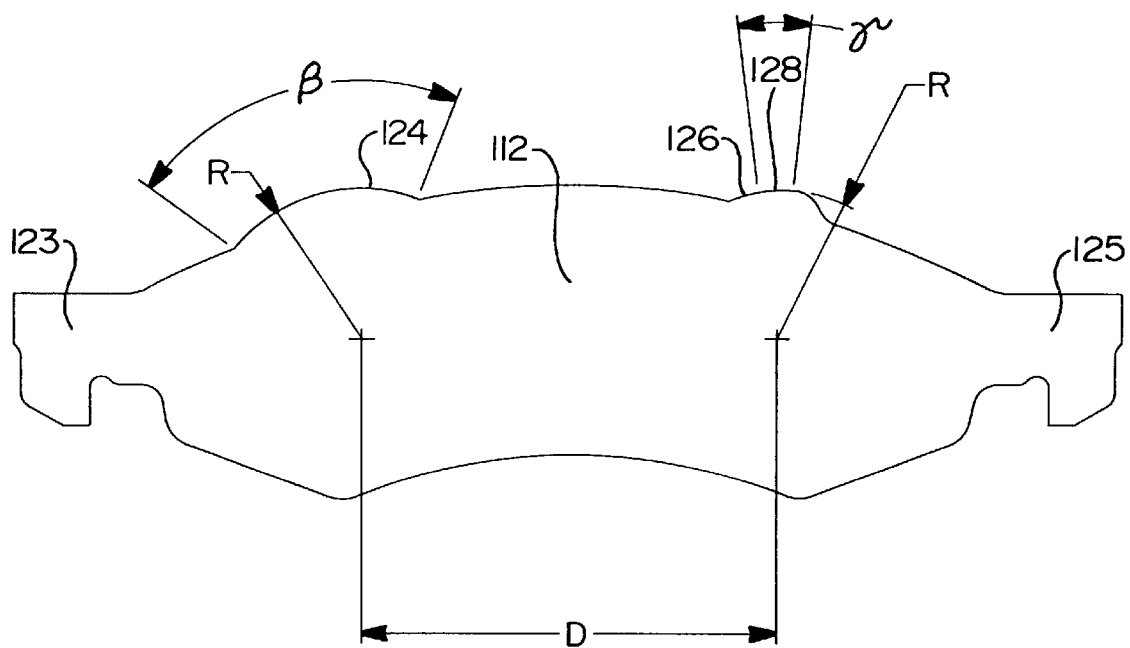
FIG 4

DISC BRAKE, DISC BRAKE CALIPER AND DISC BRAKE SHOE

BACKGROUND OF THE INVENTION

The present invention relates to a floating caliper disc brake with two brake pistons.

A typical single-piston floating caliper disc brake is described in U.S. Patent No. 4,219,106. The inner side of the floating caliper of this brake, i.e. the side carrying a brake cylinder encompassing the brake piston, is axially guided by two guiding pins detachably fixed to a supporting frame. For supporting the outer side of the floating caliper, the outer brake shoe has two T-shaped projections spaced apart from each other in peripheral direction. The radially inner arms of the projections are guided by axial guide tracks shaped on the supporting frame. The outer side of the brake caliper extends between the radially outer arms of the projections for radial support with a small peripheral clearance between the arms and the caliper to avoid an exertion of tangential forces on the caliper. At the points of support, the caliper must be machined very precisely. Additionally, the width of the caliper is limited to the space between the two radially outwardly extending arms. For a two-piston caliper, it is desirable to make the caliper wider for enhanced stiffness.

A generic two-piston disc brake is known, for instance, from published German patent application No. 39 03 251. The inner side of the floating caliper of this brake is guided as described above. The outer side of the floating caliper is engaged with a so-called spring clip. The spring clip comprises a positioning plate with circular holes that match corresponding nipples shaped on the carrier plate of the outer brake shoe. A pair of nipples on the outer side of the positioning plate is adapted to support the caliper by meshing in the recess openings on the outer side of the brake caliper that allow insertion of a tool for processing the inner surfaces of the brake cylinders. Since the caliper is not supported at its outer edges, it can be designed even wider than the brake shoes. However, the nipples are way smaller than the recess openings which have a partially circular shape, so that slight peripheral shift of the caliper results in a different radial position, for the nipples are arranged decentrally with respect to the circular portions of the recess openings. Additionally, such a spring clip presents an additional part to manufacture and to assemble which results in higher costs.

Therefore, it has been proposed for single-piston floating calipers, for example in U.S. Patent No. 5,111,914, FIG. 7, to provide the brake shoe with a radially outwardly extending protrusion, adapted to mesh in a corresponding cavity in the caliper located in the interior of the brake caliper around the edge of the central recess opening. In this way, the caliper is supported by the brake shoe which itself is supported and guided by guide surfaces shaped on the supporting frame. By this means, the width of the caliper in not limited by the width of the brake shoe either. Unfortunately, this principle cannot be transferred to two-piston floating calipers since they have no central recess opening. If such an arrangement is located only at one of the two recess openings, the support of the brake caliper is too one-sided and the other side has no sufficient radial support. If both recess openings are furnished with such a support arrangement, the system may be overdetermined due to too many positioning means which might have the consequence that supporting frame, caliper and brake shoe do not fit together.

OBJECT OF THE INVENTION

An object of the present invention is to provide a two-piston floating caliper disc brake with a support for the axially outer side of the caliper without limiting the width of the caliper.

Another object of the invention is an outer support for the brake caliper which is easy to manufacture.

A further object of the invention is to provide a support for the outer side of the brake caliper without the requirement of additional parts.

SUMMARY OF THE INVENTION

This object is achieved with two radial cavities provided at the location of the recess openings and two radial protrusions shaped on the brake shoe, at least one of which has a peripheral clearance within the cavity. By this means, the system is not overdetermined since only one of the protrusions effects a tangential positioning of the caliper.

Designing at least the wider of the two protrusions as a circular segment allows an easy manufacturing of matching circular grooves in the caliper, preferably carried out on the same set up that is used for machining the brake cylinders.

Since the protrusions are formed on the brake shoe itself, no additional parts are necessary. The support of the brake caliper is located inside the caliper without any restrictions of the caliper width.

BRIEF DESCRIPTION OF THE DRAWINGS

In the drawings,

FIG. 3 shows a cross-sectional view of a brake caliper similar to the embodiment of FIG. 1; and FIG. 4 shows a brake shoe matching the brake caliper of FIG. 3

DETAILED DESCRIPTION OF THE DRAWINGS

Figure 1:
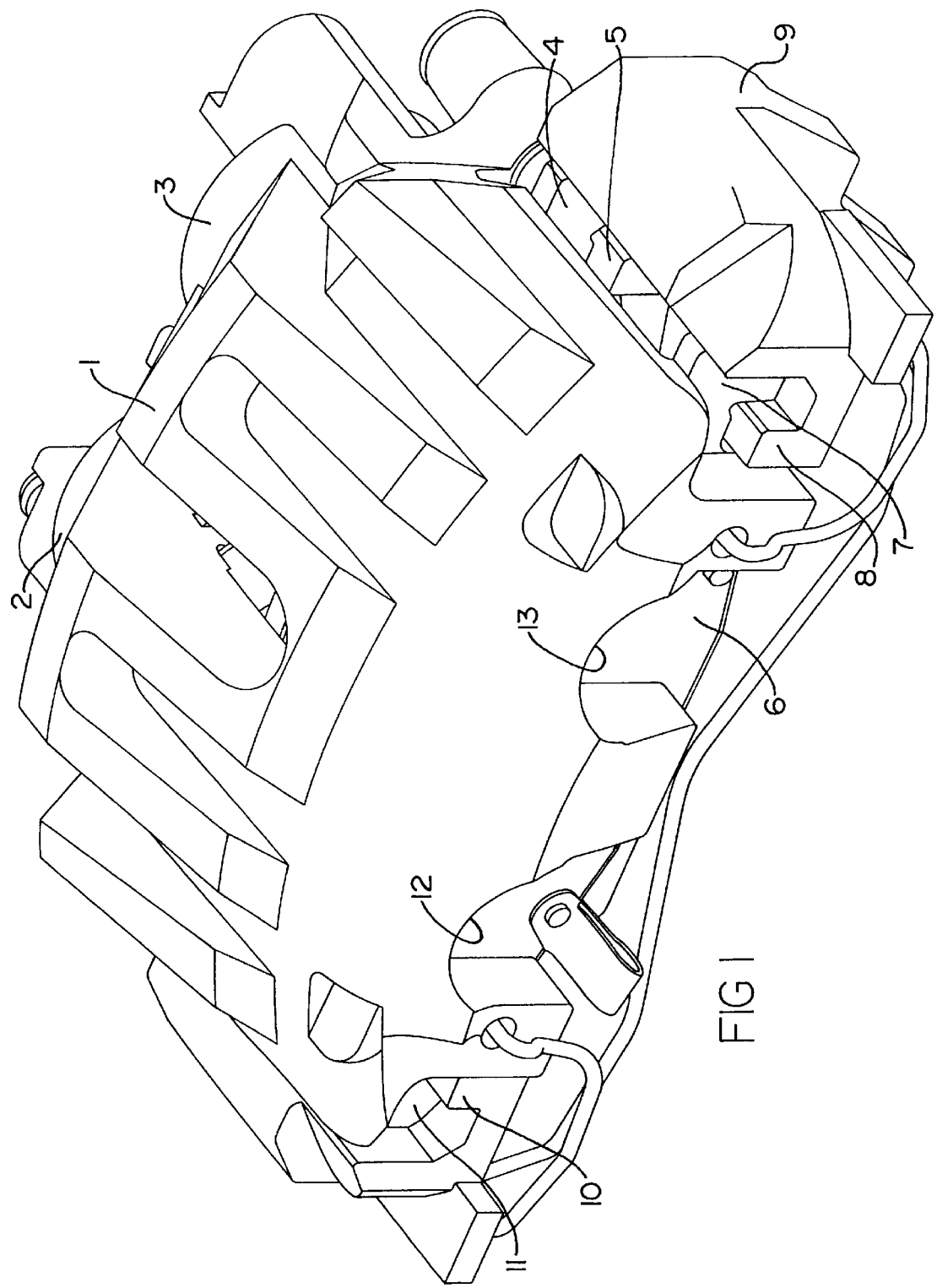
FIG. 1 shows an assembled brake caliper.

In FIG. 1, the assembled brake caliper 1 includes two brake cylinders 2 and 3 located behind the caliper bridge and only partially visible. Underneath the caliper 1, two brake shoes are arranged. Of the so-called inner brake shoe, i.e. the brake shoe next to the brake cylinders, only one of the guiding projections 4 is visible. This guiding projection is—with respect to the rotary axis of the brake disk—axially guided by a guiding track 5 formed on the supporting frame 9. Another guiding track 8 at the axial location of the outer brake shoe 6 guides the guiding projection 7 of the outer brake shoe 6, accordingly. Guiding track 10, on the left of the caliper 1, guides the guiding projection 11 of brake shoe 6 and provides a symmetric arrangement of the assembly. A corresponding guiding couple for the inner brake shoe is hidden beneath the caliper bridge.

The outer side of the brake caliper 1 comprises two recess openings 12 and 13 for an easier machining of the inner surfaces of the brake cylinders 2 and 3.

Figure 2:
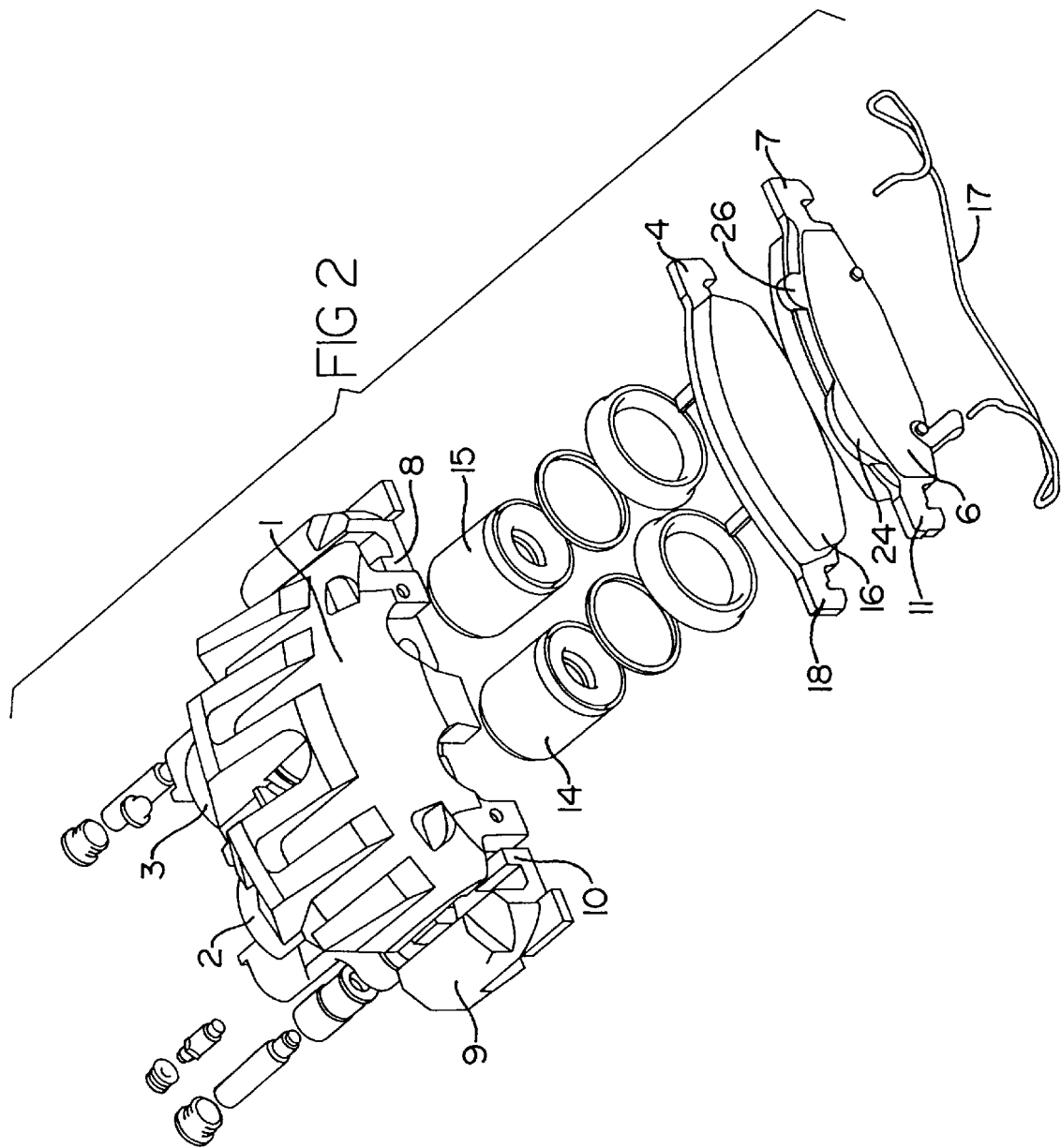
FIG. 2 shows an exploded view of the brake caliper of FIG. 1.

The exploded view of FIG. 2 shows the substantially symmetric structure of the brake caliper assembly including the brake caliper 1 with the two brake cylinders 2 and 3, two brake pistons 14 and 15 with seals and bushings, the inner brake shoe 16, the outer brake shoe 6 and a retainer spring 17. The outer brake shoe 6, however, comprises two different protrusions 24 and 26 for axial guidance while limiting radial and tangential movement of the brake shoe 6. This will be described in greater detail below where reference is made to FIG. 4.

As can be seen from FIGS. 1 and 2, the width of the caliper 1 is no more limited by an upper portion of a T-shaped projection. The projections 4, 7, 11 and 18 are substantially L-shaped, providing a guidance only relative to the supporting frame 9.

FIG. 3 shows a cross-section through a brake caliper 110 at the axial position of the outer brake shoe 112. The main difference between the two calipers of FIGS. 1 and 3 consists in the outer shape, in particular in the number of reinforcing ribs, and does not relate to the invention.

In the caliper 110, the two recess openings 114 and 116 opposite of the brake cylinders have a partially circular shape. Around these recess openings, the caliper bridge 118 comprises two identical radial grooves 120 and 122, each having the shape of a circular segment. The circles defined by either groove 120 and 122 are concentric with the circles of the respective recess openings 114 and 116, and the centers of the circles have a distance D of about 70 to 73 mm.

In this embodiment, the grooves have a length of approximately 25 to 30 mm and a curve radius R of about 30 mm. Thus, the grooves extend over an angle α of roughly 45° to 60°.

The matching outer brake shoe 112 according to FIG. 4 has two periphally extending guiding projections 123 and 125, one on each side for axial guidance along the axial guiding tracks formed on the supporting frame. In order to radially and tangentially support the caliper 110, the brake shoe 112 comprises two radially extending protrusions 124 and 126. One of these protrusions, in this embodiment the left protrusion 124, is shaped like a circular segment. The other protrusion 126 has a lesser width than the protrusion 124, and only a middle portion 128 of its rim has a circular shape. The radii r of the protrusion 126 and of the middle portion 128 are identical and a little smaller than the radius R of the radial grooves 120 and 122, in this case 27.5 mm. The centers of the circular segments the same distance D as the centers of the recess openings and 116 of the caliper 110.

Hence, the caliper 110 is radially supported by both protrusions 124 and 126 due to their identical depth. A tangential positioning, however, is only carried out by the left protrusion 124 which has a loose fit within the corresponding groove 120.

We claim:

1. A disc brake comprising:

a brake disc having a central axis, a brake support member straddling the disc and having two supporting arms which are spaced in peripheral direction of the disc brake and between which a pair of brake shoes is disposed, each of the brake shoes being disposed on a different side of the disc and being guided on guide surfaces extending parallel to the central axis of the disc and attached to the support member, a brake caliper disposed between the supporting arms and axially embracing the disc and the pair of brake shoes, said caliper having an axially inner and an axially outer side with one of the brake shoes next to the inner side and the other brake shoe next to the outer side, the caliper carrying two brake cylinders on the inner side, each encompassing an axially slidable brake piston in direct actuating relationship with the brake shoe next to the inner side, and an axial sliding guide arrangement carried by the support member and adapted to axially guide at least the inner side of the caliper, wherein the caliper has two recess openings at the outer side, both having an edge, along each of which is radially extending cavity is shaped at the axial location of the brake shoe next to the outer side and wherein the brake shoe next to the outer side has two radial protrusions, each adapted to mesh with one of the radial cavities, at least on of the protrusions having a peripheral clearance within the cavity wherein a first of the two protrusions is shaped to loosely fit in the respective cavity while the other protusion with respect to the disc radially extends as far as the first protrusion, but has a smaller extent in peripheral direction.

2. The disc brake of claim 1, wherein the radial cavities are grooves which have a circular shape and are concentric with the brake cylinders.

3. The disc brake of claim 1, wherein the first protrusion is shaped like a segment of a circle while the other protrusion has an edge of only partially circular shape at a central portion of the protrusion.

4. A disc brake shoe of lengthy shape with two sliding projections, one at each end, and with two protrusions extending from a long side, each having a width that is greater than the extent in which the protrusions project from the long side, the protrusions having a distance from each other greater than at least one of the widths of the two protrusions wherein one of the two protrusions is wider than the other.

5. The brake shoe of claim 4, wherein the wider protrusion is shaped like a circular segment.

6. The brake shoe of claim 5, wherein the other protrusion has an edge of an only partially circular shape at a central portion of the protrusion.

* * * * *

UNITED STATES PATENT AND TRADEMARK OFFICE
CERTIFICATE OF CORRECTION

PATENT NO. : 5,957,245
DATED : 09/28/99
INVENTOR(S) : Stefan U. Anger, Daniel D. Keck, and Jeffrey R. Skvarce It is certified that error appears in the above-identified patent and that said Letters Patent is hereby corrected as shown below:

In column 4, in claim 1, on line 22, please change "on" to --one--.

Signed and Sealed this

Twenty-seventh Day of March, 2001

Attest:

NICHOLAS P. GODICI

*Attesting Officer*   *Acting Director of the United States Patent and Trademark Office*